US009331468B2

(12) United States Patent
Traeholt et al.

(10) Patent No.: US 9,331,468 B2
(45) Date of Patent: May 3, 2016

(54) TERMINATION UNIT

(71) Applicant: NKT Cables Ultera A/S, Asnaes (DK)

(72) Inventors: Chresten Traeholt, Frederiksberg (DK);
Dag Willen, Klagshamn (SE); Mark Roden, Newnan, GA (US); Jerry C. Tolbert, Carrollton, GA (US); David Lindsay, Carrollton, GA (US); Paul W. Fisher, Heiskell, TN (US); Carsten Thidemann Nielsen, Jaegerspris (DK)

(73) Assignee: NKT CABLES ULTERA A/S, Asnaes (DM)

( * ) Notice: Subject to any disclaimer, the term of this patent is extended or adjusted under 35 U.S.C. 154(b) by 112 days.

(21) Appl. No.: 14/090,080

(22) Filed: Nov. 26, 2013

(65) Prior Publication Data
US 2014/0135222 A1 May 15, 2014

Related U.S. Application Data

(63) Continuation of application No. 12/532,230, filed as application No. PCT/DK2008/050072 on Mar. 19, 2008, now Pat. No. 8,624,109.

(60) Provisional application No. 60/907,116, filed on Mar. 21, 2007.

(51) Int. Cl.
*H01B 3/20* (2006.01)
*H05K 5/00* (2006.01)
(Continued)

(52) U.S. Cl.
CPC ..................... *H02G 15/34* (2013.01)

(58) Field of Classification Search
CPC ........ H01B 12/12; H01B 12/14; H01B 12/16; H02G 15/34; H02G 15/04; H02G 15/08
USPC .... 174/15.3, 15.5, 17 LF, 21 C, 21 CA, 21 R, 174/74 R, 125.1; 505/163
See application file for complete search history.

(56) References Cited

U.S. PATENT DOCUMENTS 3,692,921 A * 9/1972 Yonkers ................. H01R 11/00
174/72 R
3,764,726 A * 10/1973 Kohler et al. ................. 174/15.3
(Continued)

FOREIGN PATENT DOCUMENTS

EP 1 732 190 A1 12/2006
EP 1732190 A1 12/2006
(Continued)

OTHER PUBLICATIONS

International Search Report for PCT/DK2008/050072 dated Dec. 23, 2008.
(Continued)

*Primary Examiner* — Chau N Nguyen
*Assistant Examiner* — Roshn Varghese
(74) *Attorney, Agent, or Firm* — Pearne & Gordon LLP

(57) ABSTRACT

Cable end section comprises end-parts of N electrical phases/neutral, and a thermally-insulation envelope comprising cooling fluid. The end-parts each comprises a conductor and are arranged with phase 1 innermost, N outermost surrounded by the neutral, electrical insulation being between phases and N and neutral. The end-parts comprise contacting surfaces located sequentially along the longitudinal extension of the end-section. A termination unit has an insulating envelope connected to a cryostat, special parts at both ends comprising an adapter piece at the cable interface and a closing end-piece terminating the envelope in the end-section. The special parts houses an inlet and/or outlet for cooling fluid. The space between an inner wall of the envelope and a central opening of the cable is filled with cooling fluid. The special part at the end connecting to the cryostat houses an inlet or outlet, splitting cooling flow into cable annular flow and termination annular flow.

30 Claims, 15 Drawing Sheets

(51) Int. Cl.

| | | |
|---|---|---|
| *H01B 12/00* | (2006.01) | |
| *H01R 4/68* | (2006.01) | |
| *H02G 15/34* | (2006.01) | |
| *H02G 15/08* | (2006.01) | |
| *H01R 9/05* | (2006.01) | |
| *H02G 15/04* | (2006.01) | |
| *H02G 15/013* | (2006.01) | |
| *H01F 6/06* | (2006.01) | |

(56) References Cited

U.S. PATENT DOCUMENTS

| | | | |
|---|---|---|---|
| 3,864,508 | A | 2/1975 | Beck |
| 3,885,636 | A * | 5/1975 | Hildebrandt ............ 174/15.5 |
| 6,049,036 | A | 4/2000 | Metra |
| 6,936,771 | B2 | 8/2005 | Sinha et al. |
| 6,988,915 | B2 | 1/2006 | Hirose |
| 7,692,338 | B2 * | 4/2010 | Yamaguchi ............ 174/126.1 |
| 7,729,731 | B2 | 6/2010 | Ashibe et al. |
| 2003/0040439 | A1 * | 2/2003 | Castiglioni et al. ........ 505/100 |
| 2005/0173149 | A1 | 8/2005 | Gouge et al. |
| 2005/0236175 | A1 | 10/2005 | Reis |
| 2006/0162951 | A1 | 7/2006 | Ashibe et al. |
| 2009/0197769 | A1 | 8/2009 | Hirose |

FOREIGN PATENT DOCUMENTS

| | | |
|---|---|---|
| JP | 51-115597 A | 9/1976 |
| JP | 58-46227 | 3/1983 |
| JP | 02-30232 U | 2/1990 |
| JP | 2-88260 A | 7/1990 |
| JP | 09-190847 A | 7/1997 |
| JP | 10-126917 A | 5/1998 |
| JP | 2001-006837 A | 1/2001 |
| JP | 2003-297161 A | 10/2003 |
| JP | 2004-087265 A | 3/2004 |
| JP | 2004-537828 A | 12/2004 |
| JP | 2005-237062 A | 9/2005 |
| JP | 2005-253204 A | 9/2005 |
| JP | 2005-341737 A | 12/2005 |
| JP | 2007-28710 A | 2/2007 |
| WO | 03/012460 A2 | 2/2003 |
| WO | 03/085682 A1 | 10/2003 |
| WO | 2005/086306 A1 | 9/2005 |
| WO | 2006/067915 A1 | 6/2006 |
| WO | 2006/087761 A1 | 8/2006 |
| WO | 2006/111170 A2 | 10/2006 |
| WO | 2007/007515 A1 | 1/2007 |

OTHER PUBLICATIONS

Kim et al, "Development of the 22.9-kV Class HTS Power Cable in LG Cable," IEEE Transactions on Applied Superconductivity, vol. 15, No. 2, Jun. 1, 2005, pp. 1723-1726, XP011133931.

Gouge et al, "Tests of Tri-Axial HTS Cables," IEEE Transactions on Applied Superconductivity, vol. 15, No. 2, Jun. 1, 2005, pp. 1827-1830, XP011134025.

Definitions of "flow" and "support" form TheFreeDictionary.com.
Definitions of "communication" form Dictionary.com.
Japanese Office action for 2013-030926 dated Nov. 4, 2014.

* cited by examiner

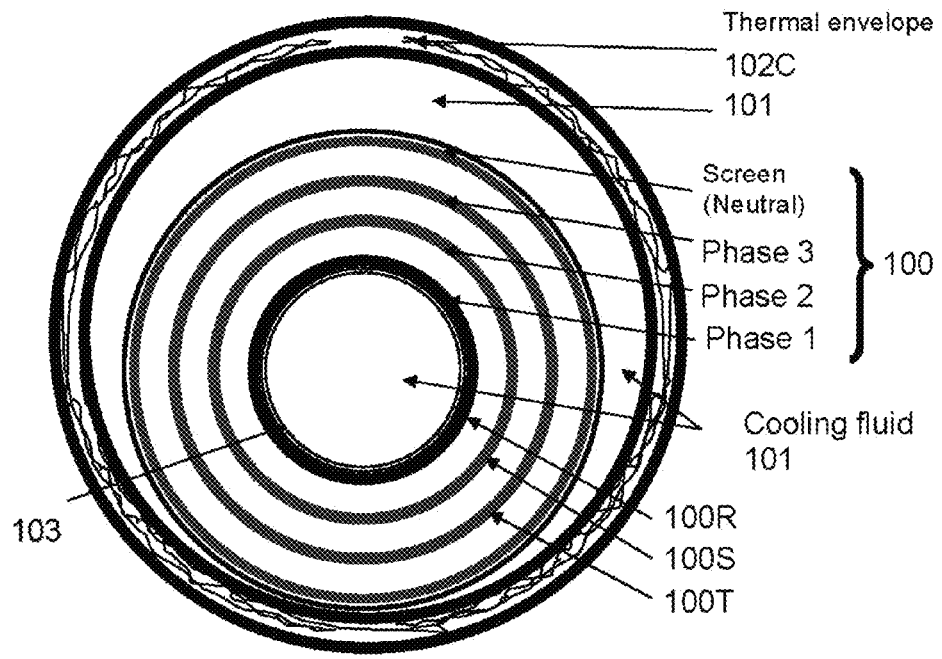
Figure 1 — Triax cable and thermal envelope cross section
Function: Conducting power
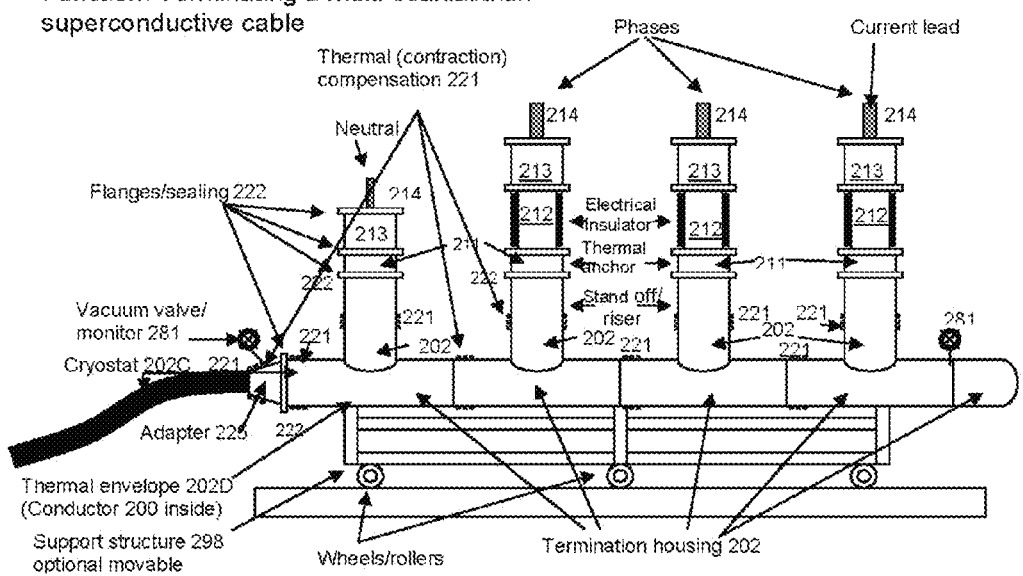
Figure 2 — Termination unit
Function: Terminating a multi-coaxial/triax superconductive cable

Figure 3     Termination unit
Function: Modular build of a termination unit for multi-coax/triax cable
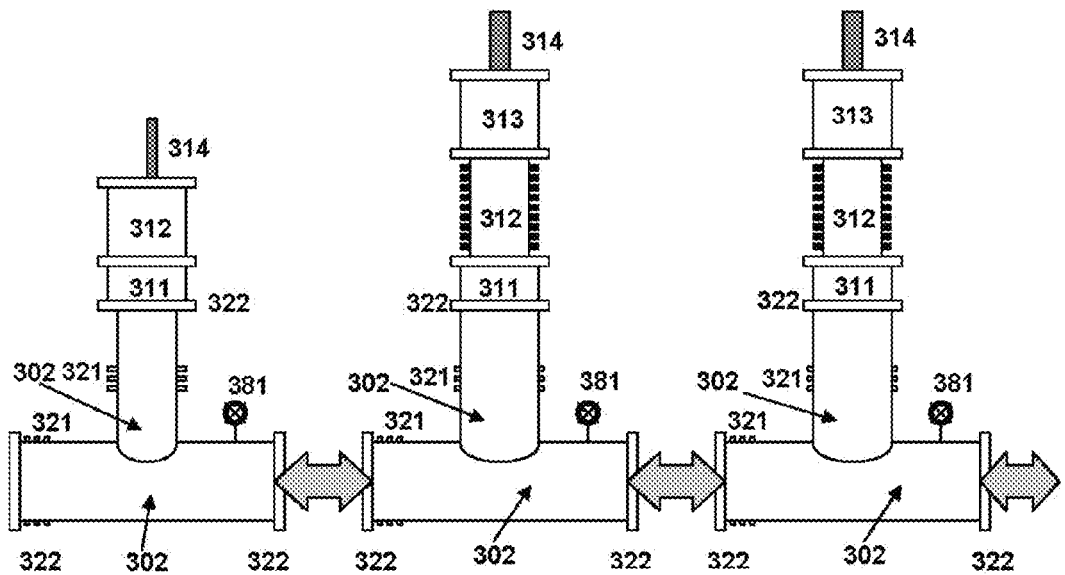
Figure 4     Termination unit
Function: Modular build of a coax (single phase) cable
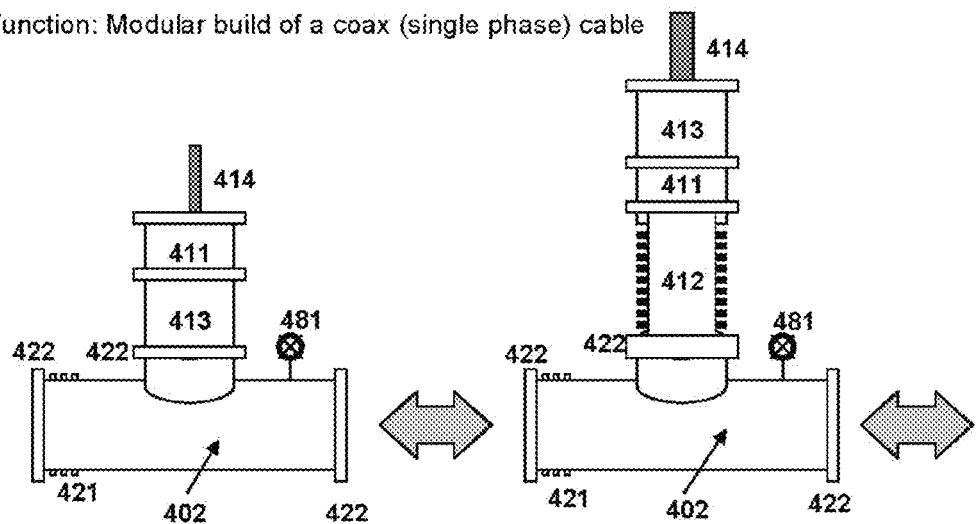

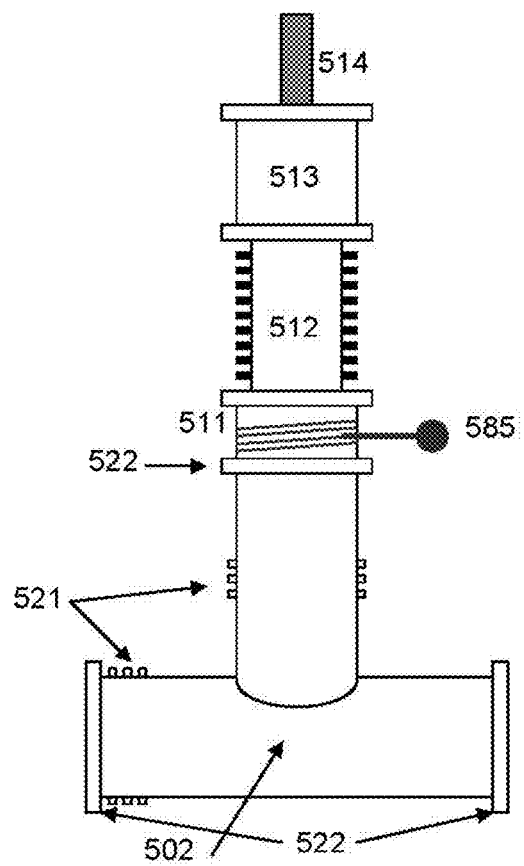
Figure 5 Termination unit module
Function: Ambient thermal anchor

Figure 6    Termination unit module
Function: Sensors and diagnostics
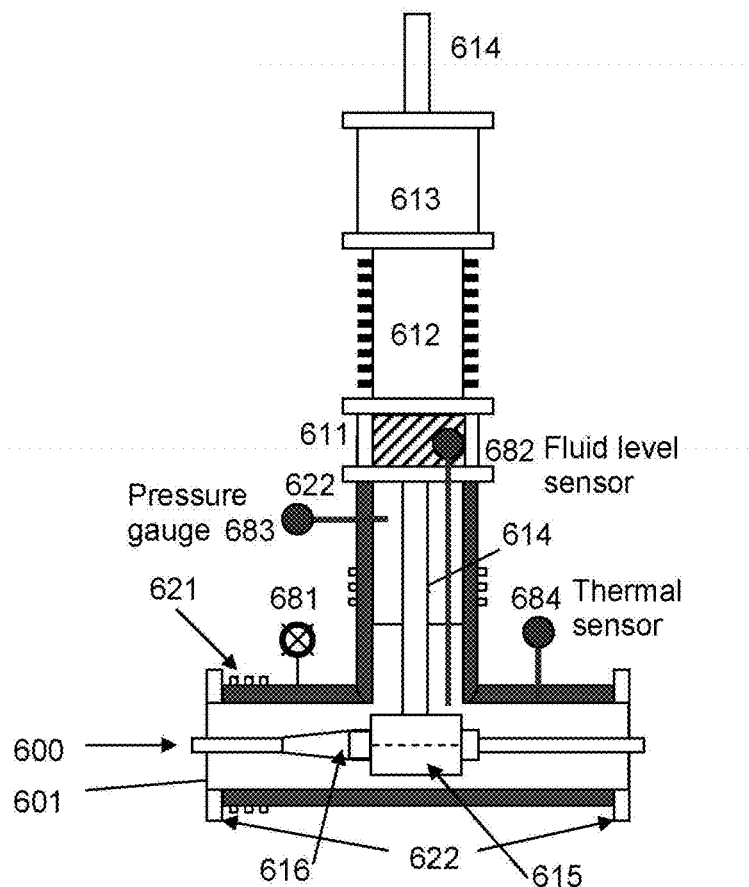

Figure 7    Flexible current lead
Function:
Allow flexibility of current lead
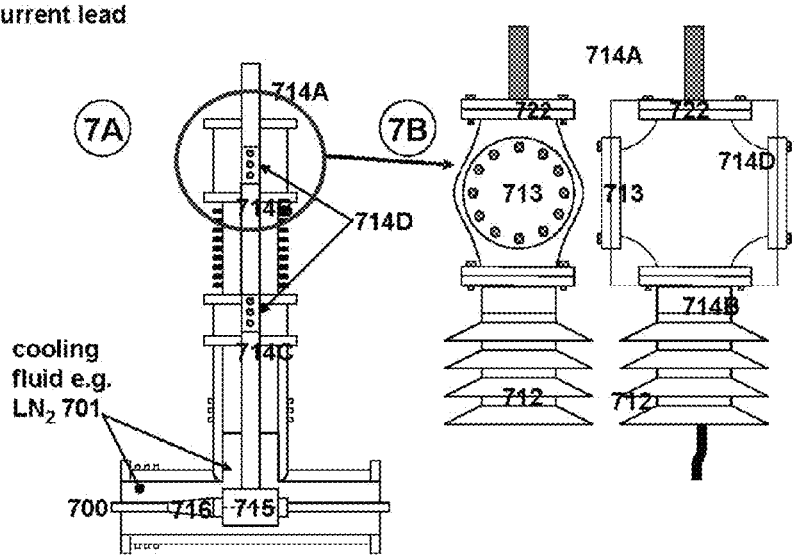

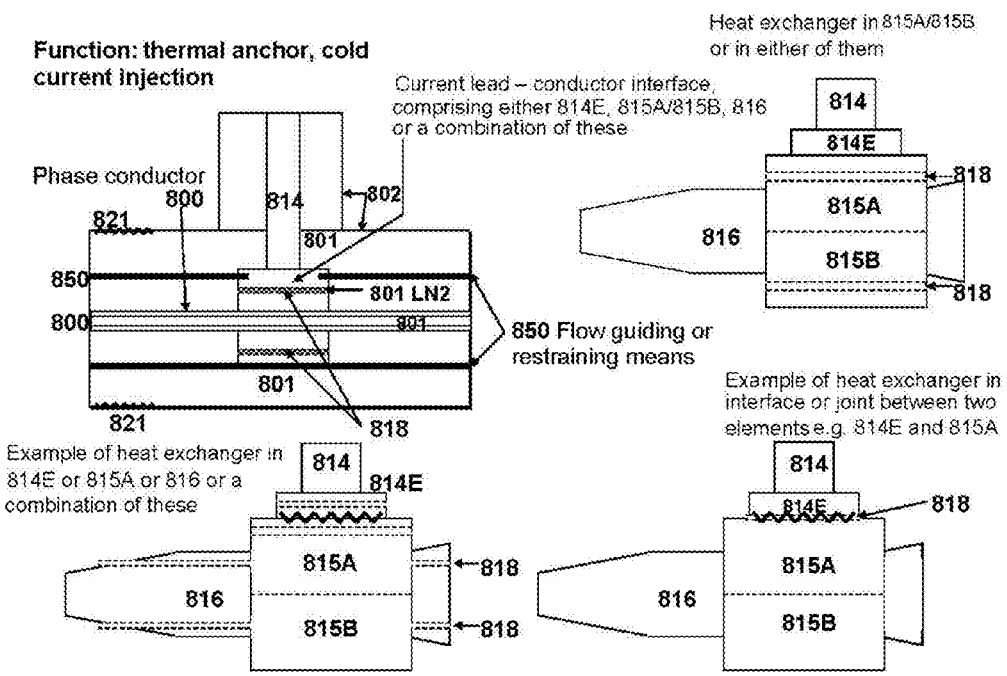

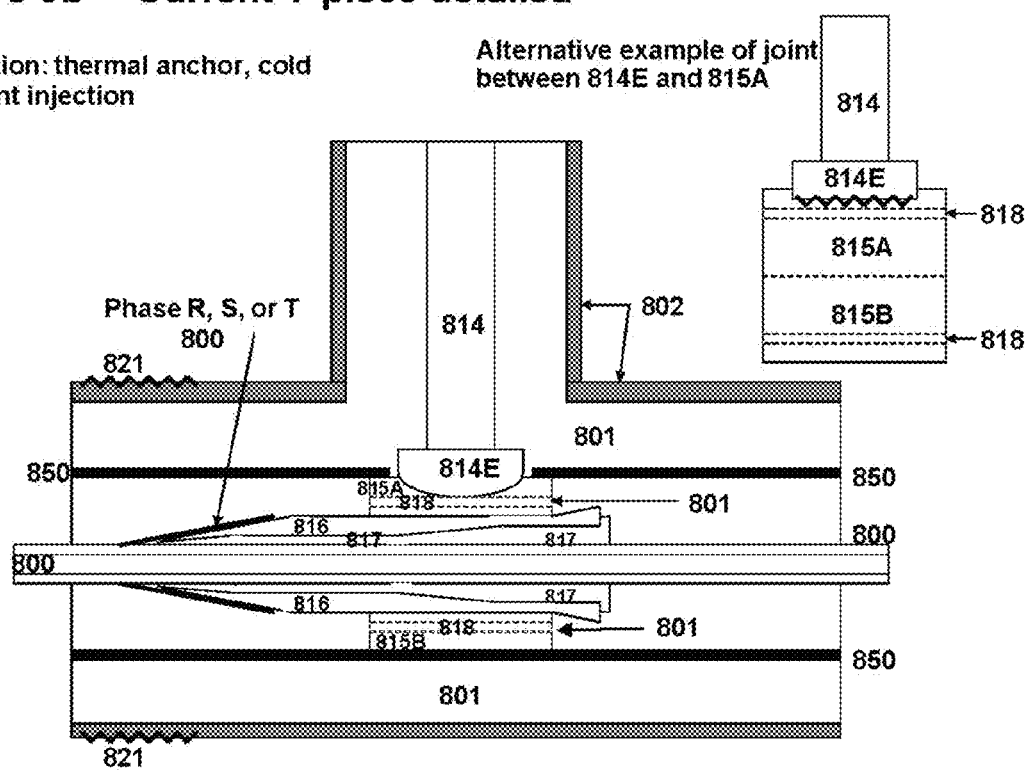
Figure 8b   Current T-piece detailed

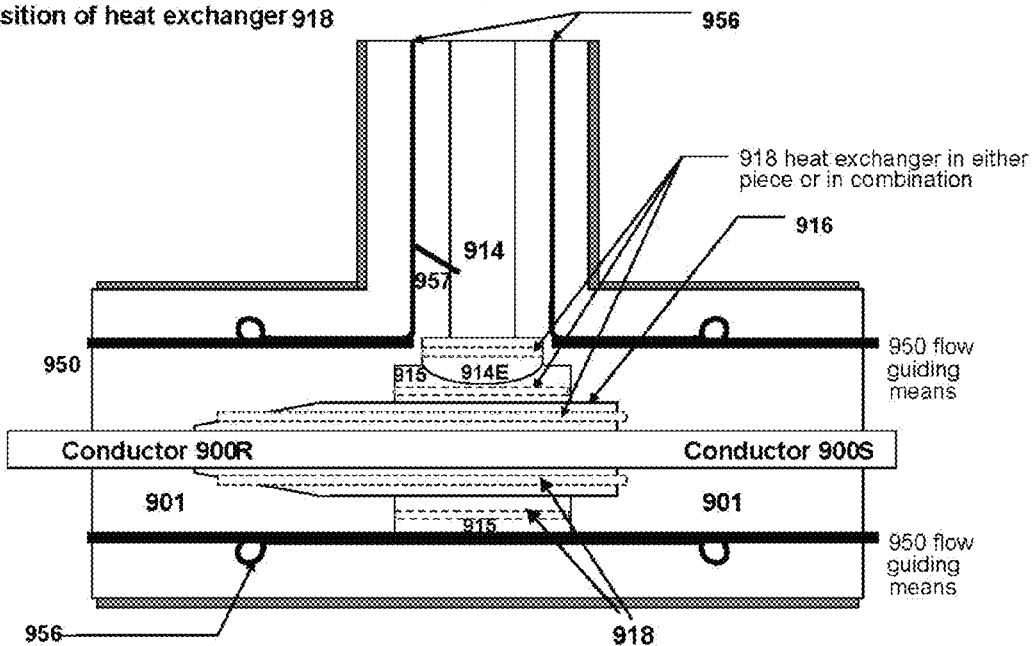
Figure 9a  Voltage T schematic

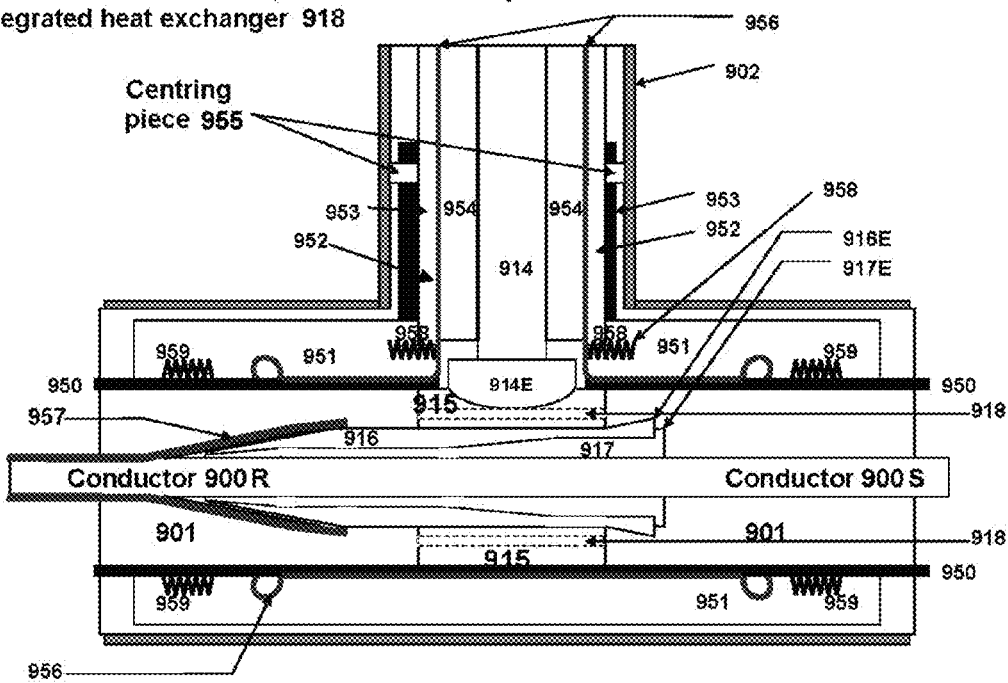
Figure 9b  Voltage T example of detailed embodiment
Function:
Electric field control 956, around current T-piece and integrated heat exchanger 918

Figure 10  Function:
Control fluid in/out of cable central and/or annular space
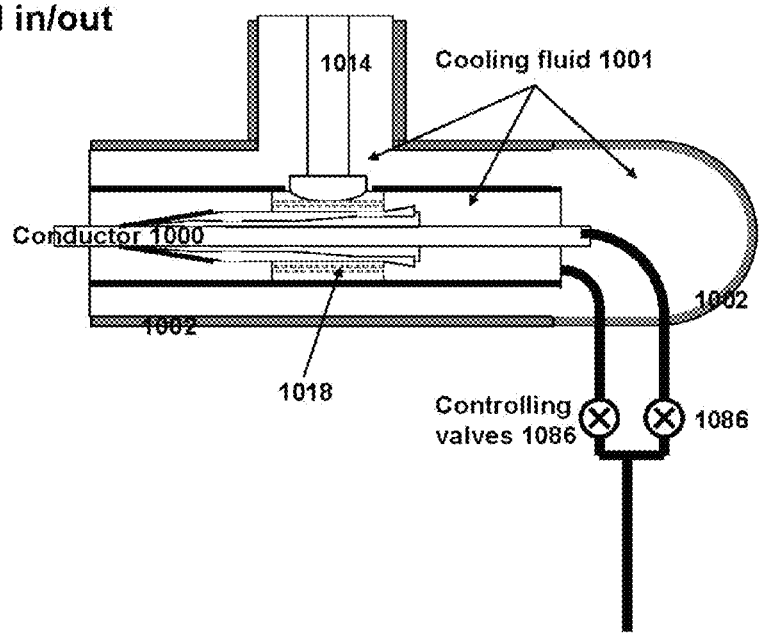

Figure 11a Function:
Control cooling fluid in/out of cable and termination individual
Fluid in/out supply end
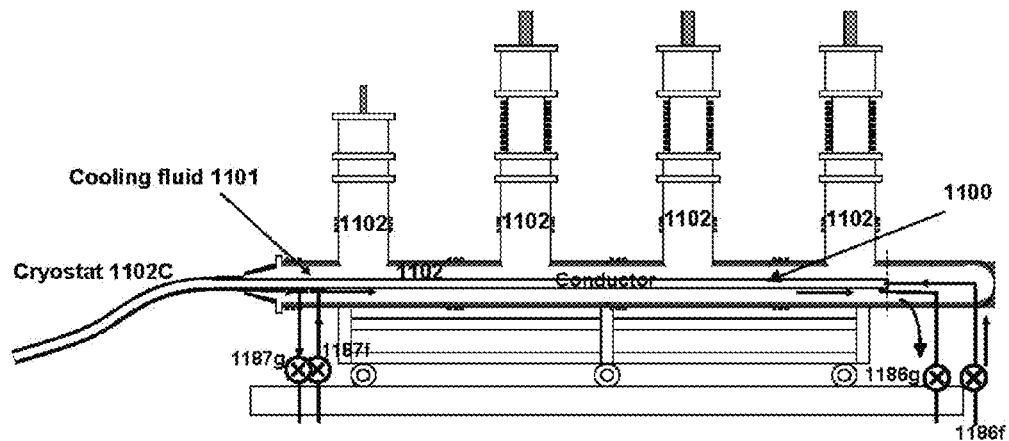
Figure 11b Function:
Control cooling fluid in/out of cable and termination individual
Fluid in/out opposite end
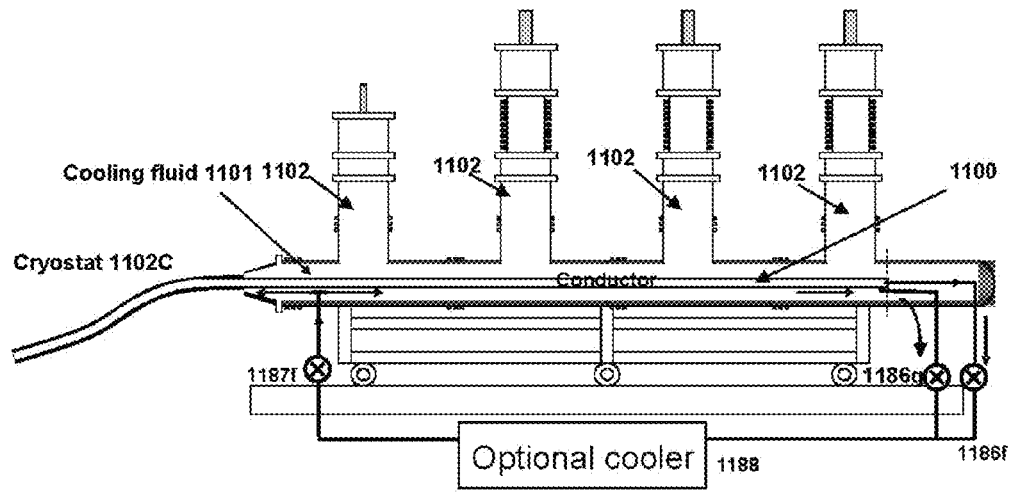

Figure 12     Cryostat adaptor/interface
Function: Adapts cryostat to dimension of end-section. Provides vacuum insulation of transition piece
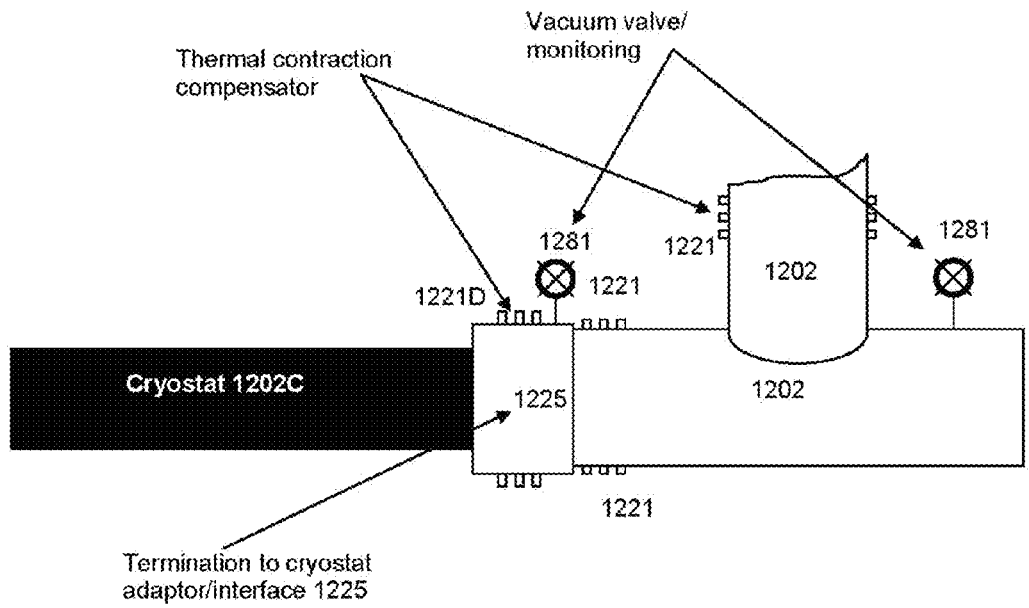
Figure 13     Cryostat adaptor & mechanical fixture
Function: Provides fixture and reference for cable with respect to end-section
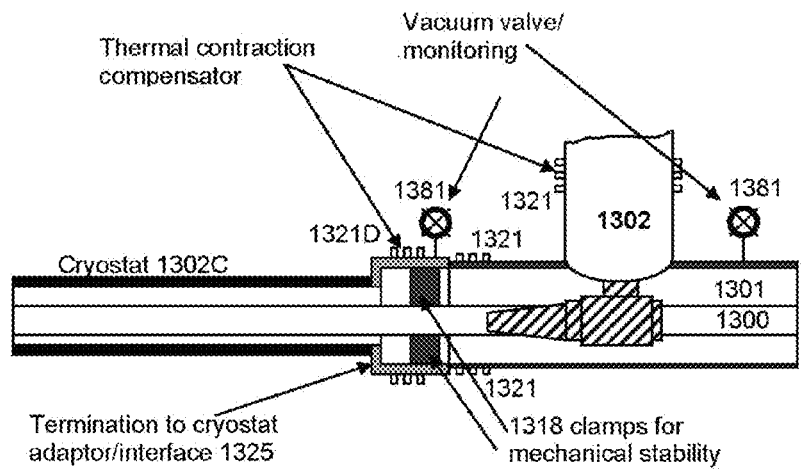

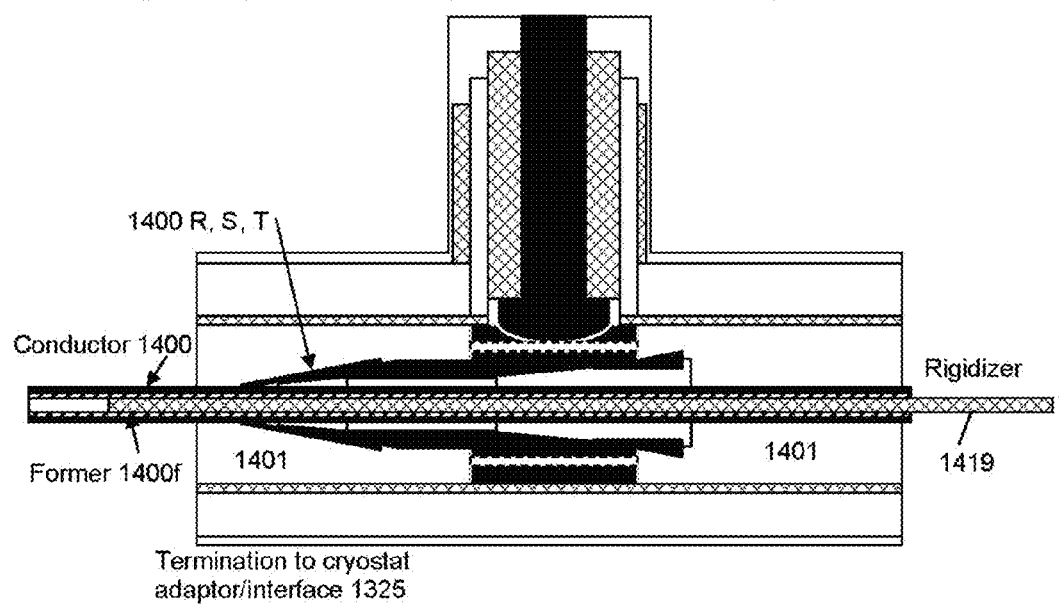
Figure 14 End-secton of cable. Rigidizer
Function: Provides mechanical stability to cable end section

Figure 15  Sleeve soldering section
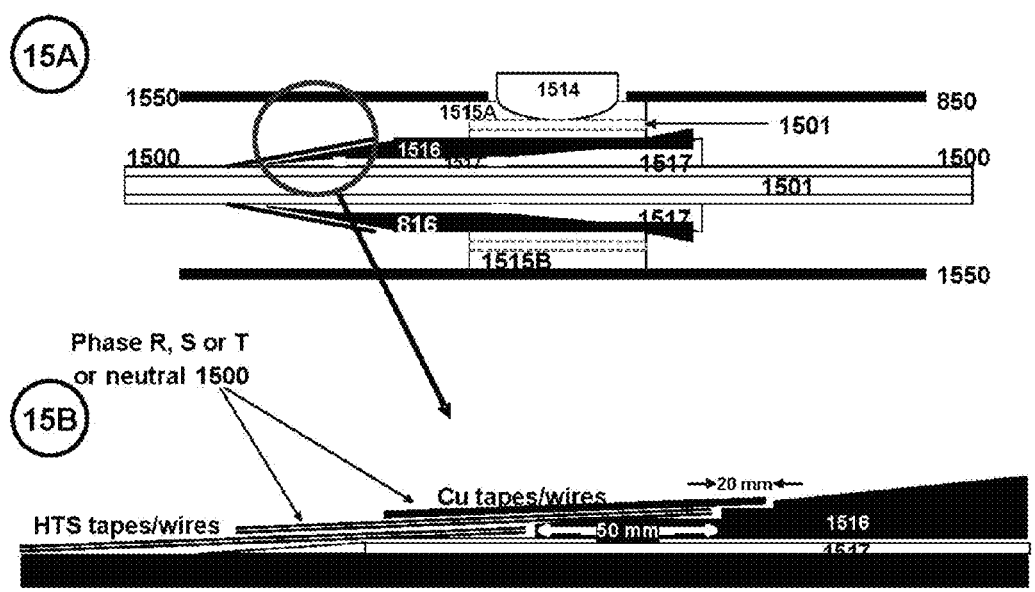

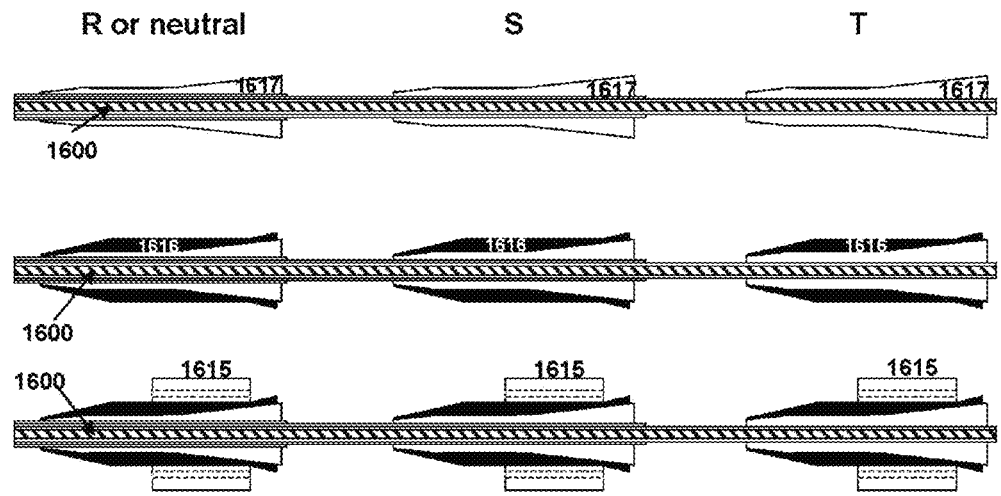
Figure 16    Equalising insert and current sleeve
Function:
Provide equal radial dimension to current sleeve and/or current clamp

TERMINATION UNIT

STATEMENT REGARDING FEDERALLY SPONSORED RESEARCH OR DEVELOPMENT

This invention was made with support under Contract No. DE-FG36-02GO12070 awarded by the United States Department of Energy. The Government has certain rights in this invention.

TECHNICAL FIELD

A power cable installed in an electrical grid needs to connect to the grid/bus bars through terminations. The present invention relates to a termination unit for electrically terminating a cooled cable system e.g. cryogenically cooled cable system at ambient temperature.

BACKGROUND ART

In general a superconducting (SC) cable must be kept at cryogenic temperatures (0-150 K or −273.25 to −123° C.) in order to function as intended/designed. Usually a cable section connects to other system components operated at ambient or elevated temperature.

In the following the general term "superconducting cable system" is used to denote a superconducting and/or hyper-conductive cable (e.g. a multi-phase, such as a three phase, cable) in combination with the relevant thermal insulation envelope.

In order to terminate a SC cable system some basic elements are normally needed, namely termination of:
1. the conductor (current element),
2. the electrical insulation (voltage element),
3. the thermal insulation (thermal element),
4. the cooling means, e.g. fluid cryogen (cooling element), and
5. optionally varying diagnostics (diagnostics element).

Items 3), 4) and 5) are elements which are normally not present in conventional cables although 4) has some similarities to cooled bus bars and element 5) is to a certain degree also present in oil insulated cables where the oil is kept at a certain pressure that is continuously monitored. Different optional diagnostics can be implemented, e.g. monitoring of pressure, temperature (internal and/or external), flow, cryogenic fluid level, air humidity, etc.

A tri-axial HTS cable design with three concentric phases surrounded by a concentric neutral conductor (as e.g. described in US 2005173149 A (GOUGE ET AL.) 11-08-2005 and in WO 2006/111170 A (NKT CABLES ULTERA) Oct. 26, 2006) have certain advantages over other HTS cable designs.

The advantages over a cold-dielectric co-axial design include:
1. Reduced use of superconducting material by 34-50% leading to reduced cost and reduced energy loss.
2. Reduced use of cryogenic envelope materials and cold surface by 30-50% leading to reduced cost and increased energy efficiency.

Advantages compared to warm-dielectric single-phase cables include:
1. No external magnetic fields creating disturbances externally to the cable.
2. Improved relation between the electrical properties of inductance and capacitance leading to longer critical lengths, improved stability and reduced load-dependant voltage drops.
3. Reduced magnetic fields internally in the cable leading to lower energy losses and improved performance of the superconducting materials.
4. Reduced use of cryogenic envelope materials and cold surface by a factor 30-50% leading to reduced cost and increased energy efficiency.
5. Reduced number of cryogenic envelopes leading to fewer welding and fabrication steps, lower fabrication costs and increased reliability.

Disadvantages compared to the two alternative designs may include the following:
1. Less well-known dielectric than the warm-dielectric single phase leading to higher risk in utilisation.
2. More complex cable design and termination design than the co-axial cold dielectric and the warm-dielectric single phase leading to higher risk in fabrication and in utilisation.
3. Inherently/generically imbalanced impedances in phases 1, 2, and 3.

Advantages of HTS cables over conventional cables with conductors of copper or aluminium include normally a higher current carrying capability, reduced generation and release of heat along the cable, lower electrical loss, and lower weight.

Disadvantages compared to the conventional alternatives include normally the necessity of a cooling system, continuous thermal loss through the thermal insulation, and increased complexity of accessories such as joints and terminations.

Termination units for superconducting cable systems are discussed in a number of prior art documents.

U.S. Pat. No. 6,988,915 B (SEI) 24 Jan. 2006 deals with a terminal structure of a direct electric current superconducting cable wherein the end portions of the superconducting layers provided over a core liner are exposed in a step-by-step manner from an outer layer to an inner layer, and outgoing conductors made of a conventional conductive material are individually connected with the exposed end portions of the respective superconducting layers. An insulating fixing member supports the core and the outgoing conductors.

WO 2005/086306 A (SEI) 15 Sep. 2005 deals with a terminal structure for a multi-phase superconducting cable, wherein an electrically conductive sleeve is disposed around each of the concentrically arranged superconductive layers carrying the electrical phases and electrically connected thereto and to leads for extracting each phase at room temperature.

U.S. Pat. No. 6,936,771 B (SOUTHWIRE COMPANY) 30 Aug. 2005 deals with a termination unit for connecting a high temperature superconducting (HTS) cable immersed in pressurized liquid nitrogen to high voltage and neutral (shield) external bushings at ambient temperature and pressure. The termination unit comprises a cold housing connected to a warm housing via a transition duct wherein one or more capillary passages through or parallel to the transition duct allow gas to flow to maintain pressure equilibrium between said cold housing and said warm housing.

US 2005173149 A (GOUGE ET AL.) 11 Aug. 2005 deals with a termination unit for a superconducting cable comprising three concentrically arranged superconductive layers (tri-axial). The electrical phase conductors are terminated to copper tubes. In a preferred embodiment the tubes are concentric and separated by solid insulating tubes. The cable is cooled through liquid coolant streams inside the central tube of the cable and outside of the cable. In a preferred approach, the cold end of the termination is conduction cooled from the outside with the liquid coolant at ground potential. This requires an electrically insulating material with a high thermal conductivity.

DISCLOSURE OF INVENTION

The objective of the present invention is to benefit from the advantages of superconducting and hyper-conducting cables by providing a reliable and economic feasibly connection between the high-voltage phase conductors and neutral conductors in these cables and external equipment such as generators, transformers, breakers, power networks, other cables or other appliances.

The objective of the invention has been achieved by the invention and embodiments thereof as defined in the claims and as described below.

According to the invention the termination unit comprises an end-section of a cable for, one or several branch current leads and a surrounding thermally insulation envelope adapted to comprising a cooling fluid, wherein the branch current leads being individually insulated from said thermally insulation envelope by individual electrical insulators.

Embodiments of the invention have shown to provide additional benefits as it will be clear from the following description and claims.

The end section of the cable defines a central longitudinal axis, the end-section comprising end-parts of N electrical phases and an end-part of a neutral conductor, the end-parts of the N electrical phases and the neutral conductor each comprising at least one electrical conductor and being arranged in the cable concentrically around a core former with phase 1 located relatively innermost, and phase N relatively outermost in the cable, phase N being surrounded by the neutral conductor. Electrical insulation being arranged between neighbouring electrical phases and between phase N and the neutral conductor. The end-parts of the neutral conductor and the electrical phases each comprise a contacting surface for being electrically connected to a current lead (branch current lead). The contacting surface of the neutral conductor and the respective electrical phases is provided by an uncovered part of the neutral conductor/electrical phase, i.e. an uncovered part where electrical insulation has been removed to expose and provide access to the contacting surface for providing the connection to the branch current lead. Each of the uncovered parts (which provide the contacting surfaces) having a longitudinal extension preferably with a minimum length, and the uncovered parts being located sequentially along the longitudinal extension of the end-section of the cable.

In the present context the term 'cable' is used for a part of the 'cable system' comprising the electrical conductors and corresponding electrical insulation between adjacent electrical conductors (and optionally further layers related thereto). A 'cable system' according to the invention thus comprises a 'cable' in the above sense and a thermal insulation surrounding the cable wherein the cable is located.

In an embodiment, the cable is eccentrically located relative to the central longitudinal axis of the thermal insulation over at least a part of its longitudinal extension.

The terms innermost/outermost relative to the cable is taken to mean, respectively, closer to/farther away from the cable former. Alternatively, it may be taken to mean, respectively, closer to/farther away from the central longitudinal axis of the end-section of the cable.

The numbering of the electrical phases 1, 2, . . . , N is not intended to imply any particular properties or mutual relationships to the phases (such as e.g. size or angle relationships). In general, the electrical phases may be arranged in any order. In practice, the order providing the lowest electrical loss may be found by optimization, e.g. by variation of the phase angles of neighbouring electrical phases, the material, number, form, winding angles, etc. of the electrical conductors constituting the electrical phases.

The term 'uncovered part' of the cable is in the present context taken to mean a length of the cable, where the electrical insulation normally surrounding an electrical phase (or a neutral conductor) is removed to provide electrical access to the electrical phase (or neutral conductor) in question.

The term 'current lead' and 'branch current lead' are used interchangeable.

In an embodiment of the termination unit at least one of the electrical connections between a contacting surface and a neutral conductor/electrical phase comprises an electrical field control system totally or partly surrounding the contacting surface and providing an equi-potential volume at the respective phase voltage.

In one embodiment a cooling fluid is adapted to be directed inside said equi-potential volume. The cooling fluid may in principle be any cooling fluid providing the necessarily cooling.

As it can be understood, the cooling arrangement of the present invention provides a highly reliable cooling, which stabilizes the system and results in relatively high current ratings. Due to this stable and reliable cooling arrangement several different cooling fluids may be used.

In an embodiment wherein the end-section comprises at least one current lead base, the termination unit is arranged such that a cooling fluid will exchange heat with said at least one current lead base above said current lead and above said contacting surface. Thereby an additional cooling effect can be obtained.

The current lead base provides transition from current lead to phase or neutral conductor. The current lead base may be provided by the electrically connection between the (branch) current lead and the neutral conductor/electrical phase.

In the equi-potential volume, cooling fluid may preferably exchange heat with the current lead base. Additionally, in may exchange heat with one or more additional electrically conductive elements applied in the electrical connection between a contacting surface and a branch current lead. In an embodiment, the additional electrically conductive elements comprise one or more current sleeves arranged to be in good electrical contact with respective contacting surface of the conductor(s), one or more current clamps contacting said current sleeves, and optionally additional connecting elements connecting said current lead base with the clamps.

The current lead base and other electrically conductive elements enclosed in said equi-potential volume may in an embodiment contain provisions for heat exchange with cooling fluid, said heat exchange realised by forced flow cooling through and/or passed holes, grooves, fins, profiles but not limited to. The current sleeve and/or current clamp may have relatively large contacting surface and adapted dimensions may be arranged such that the exact position in longitudinal direction is not critical but allows a robust longitudinal tolerance.

In one embodiment the equi-potential volume is realised by a number of insulator pieces and having a conductive and/or semiconductive inner surface for field controlling reasons.

In an embodiment of the termination unit the equi-potential volume contains a branch current lead connected to at least one of the elements, a current lead base, a current clamp, and a current sleeve, the branch current lead ultimately being connected to the contacting surface of the neutral conductor or one of the electrical phases, and wherein at least one of said elements preferably having provision for cold thermal anchoring by forced flow cooling (such as grooves, holes, profiles and flanges) past and/or through the current lead base, current clamp, current sleeve and/or the interface between either of said elements, said electrical phase preferably being a conductor selected from a superconductive, a hyper-conductive and a conventional conductor.

In an embodiment the contacting surfaces being located sequentially along the longitudinal extension of the end-section of the cable and are arranged according to a modular concept by ensuring that a the contacting surface of each of the neutral conductor and electrical phases at least over a part of the lengths of their contacting surfaces are located at a substantially equal radial distance from the central longitudinal axis.

This embodiment the termination unit has the additional benefit of providing a connection which can be used for different cable types and for different phase conductors in the same cable type.

The radial distance from the central longitudinal axis of a contacting surface of the neutral conductor/electrical phase(s) may be regulated using a regulating insert, the regulating insert may e.g. be an adaptive insert as described below but it may also regulate the radial distances from the central longitudinal cable axis to a contacting surface such that these distances remains unequal. The structure of the regulating insert may be as described for the adaptive insert below, but without the restriction that the contacting surfaces should be adapted to substantially same radial distances from the central longitudinal cable axis.

In an embodiment the contacting surfaces of the end-section of the cable being located with substantially equal longitudinal distance between them. Thereby the termination unit may be even more cost effective to produce, because the amount of different elements used can be reduced.

Substantial equal longitudinal distance as well as substantially equal radial distance may be obtained by any means. In an embodiment the substantially equal radial distances are obtained by radial adaptive inserts (e.g. fiber-reinforced epoxy plastic such as the material sold under the trade name G10™) that have substantially identical outer radial dimensions, and where said radial adaptive inserts are applied to the contacting surface of each phase and neutral equalising their dimension with respect to longitudinal and specifically radial dimension in the end-section of the cable.

In an embodiment the substantially equal radial distance from the central longitudinal axis of the end-section of the cable of the contacting surfaces of the neutral conductor and electrical phases is substantially provided by individual adaptation of inner radial dimensions of such adaptive inserts.

The adaptive inserts may be provided by any suitable materials, preferably comprising at least one of electrically insulating material and semi-conducting material to prevent an undesired electrically path. In an embodiment the radial adaptive inserts are in the form of regulating inserts and are made of electrically insulating material, semi-conducting material, or of a combination of such materials.

In an embodiment radial adaptive inserts provide said equal radial dimension of the contacting surfaces wherein at least one of the elements, a current lead base, a current clamp, and a current sleeve are overlaying the respective adaptive insert to provide the electrical connection between said respective contacting surfaces and said respective branch current leads.

In an embodiment at least one of said adaptive inserts is located between electrical conductor(s) of the uncovered part (contacting surface) of the neutral conductor or electrical phase and an underlying insulation layer.

The adaptive inserts may have any desired thickness to provide the desired adapting.

The adaptive inserts provide the advantage of facilitating the connection of branch current leads to the electrical phases or neutral of the end-section of the cable. They further facilitate a modular build-up of the termination unit, including the thermally insulating enclosure. For example as described below.

The adaptive inserts may further provide mechanical support to the end-section of the cable, and provide a protection against heat damage of the underlying layers of the end-section of the cable during processing (e.g. soldering) and mounting of the end-section of the cable, e.g. in a termination unit.

In an embodiment the termination unit comprising one or several longitudinal spacers that provides a fixed distance between each of the branch current leads.

The end-section of the termination unit may for example comprise longitudinal spacers that provide equi-distance between phases and neutral. These longitudinal spacers may additionally provide flow control, flow separation, electric insulation and/or a modular assembly/build system. The end-section may comprise radial adaptive inserts that provide equalised longitudinal and specifically radial dimension, and the adaptive inserts may for example provide options for additional dielectric and a modular build concept.

In an embodiment the longitudinal spacer(s) function(s) as flow control or flow restraint for the cooling fluid guiding at least a part of the cooling fluid through the heat exchanging means near the contacting surface or the base of the base current lead.

In an embodiment the longitudinal spacers provide substantial equi-distance between each of the branch current leads.

As described above at least one of the neutral conductor or electrical phases may have electrical contact to a current sleeve. The current sleeve may in principle be of or comprise any kind of electrically conductive material. Often it is however preferred that the current sleeve being at least partially of a conventional electrically conductive material.

In an embodiment, an electrically conductive sleeve is mounted around the cable-end, e.g., on top of an adaptive insert. The conductive sleeve is mounted in electrical contact with the contacting surface of the electrical phase or neutral conductor. The electrical contact may preferably be provided by a direct contact between the conductive sleeve and the electrical phase or neutral conductor. In an embodiment, the electrical phase or neutral conductor partly overlay the conductive sleeve. In these embodiments superconducting material from the cable itself may constitute at least a part of said sleeve contacting surface.

In a particular embodiment, the at least one conductor of at least one of the neutral conductor or electrical phases is surrounded by and has electrical contact to a current sleeve of a conventional electrically conductive material. In a further embodiment, said current sleeve is made at least in part by superconducting material and/or hyper conductive material.

The term 'a conventional electrically conductive material' is in the present context taken to mean a material that is electrically conductive but has a finite electrical resistance at room temperature as well as at cryogenic temperatures (i.e. a material that is NOT superconductive at the temperatures in question). 'Cryogenic temperatures' are taken to mean temperatures below 0° C. (273 K) to which the end-section of the cable system is cooled during normal operation, e.g. at or below the boiling temperature (at a given operating pressure)

of the fluid (e.g. liquid $N_2$) used to cool the end-section of the cable in a termination unit, e.g. temperatures between 0 and 77 K.

In one embodiment, the current sleeve has a sleeve contacting surface for being electrically connected to a current lead.

In an embodiment at least a part of the current sleeve provide the electrically connection between said contacting surfaces and said respective branch current leads. In this embodiment the current sleeve may have a sleeve contacting surface electrically connected to a branch current lead.

In a particular embodiment, wherein the termination unit comprises two or more current sleeves in electrically connection with neutral conductor/electrical phase(s) and with respective sleeve contacting surfaces, these sleeve contacting surfaces are located at a substantially equal radial distance from the central longitudinal axis of the end-section of the cable.

In an embodiment wherein two or more of the neutral conductor or electrical phases have electrical contact to respective current sleeves, the dimensions of said current sleeves may preferably be substantially identical.

In an embodiment a substantially equal radial distance from the central longitudinal axis of the sleeve contacting surface of the neutral conductor and electrical phases is provided, preferably by individual adaptation of radial dimensions of said current sleeves. For example the current sleeves may have different inner dimensions and essential equal outer dimensions.

In an embodiment, the sleeve(s) comprises a sloping section for connecting to the tape/wire conductors of the superconducting cable, e.g. through soldering.

In a further embodiment the soldering section is manufactured with terraces adapted in length and height to the relevant HTS tapes/wires and optional shunting conventional conductor tapes.

The radial regulation of said contacting surface/sleeve contacting surface of each electrical phase or neutral to achieve a constant radial distance of said surface from the longitudinal axis of the end-section of the cable can be achieved in any appropriate way by proper adaptation of the materials and the construction underlying the contacting face.

In a particular embodiment, the radial extension of at least one of the electrically insulating and electrically conducting materials surrounding or underlying the individual contacting surfaces of the neutral conductor or electrical phases is individually adapted to provide the individual contacting surfaces and/or the individual sleeve contacting surfaces with a constant radial distance from the longitudinal axis.

In a particular embodiment, an adaptive insert of an electrically insulating material, semi-conducting material, or of a combination of such materials, is inserted between the end parts of the neutral conductor or electrical phase and the neighbouring, underlying electrical phase at the location of the contacting surface of the neutral conductor or electrical phase in question.

In a particular embodiment, at least two electrical phases or neutral, such as a majority or all electrical phases or neutral, comprise sleeves having substantially identical outer and inner radial dimensions. Preferably all electrical phases and neutral being provided with a current sleeve comprising substantially identical dimensions.

In an embodiment the termination unit comprises at least one current clamp made at least in part from a conventional electrically conductive material, such as, but not limited to Cu. The current clamp being electrically connected to a current lead, and being clamped to said contacting surface and/or to said sleeve contacting surface. The current clamp may preferably be shorter than the axial length of the contacting surface and/or shorter than the sleeve contacting surface. Thereby the contacting surface and/or the sleeve contacting surface presenting a broad electrical contact (in longitudinal terms) to said current clamp, allowing a large tolerance of the movement of the current clamp/current lead in a longitudinal direction of the end-section of the cable (e.g. during mounting and heating/cooling of the cable system).

In an embodiment at least one of said current clamps comprises through going holes for additional cooling.

In general it is normally desired that at least one of the electrical phases and neutral conductor comprises superconductive or hyper-conductive material.

In an embodiment at least one of the electrical connections comprises an electrical field-control system totally or partly surrounding the contacting surface and at least a part of said branch current lead. By this electrical field-control system a very reliable and stable system can be obtained.

The electrical field-control system may comprises a dielectrics, such as the dielectric sold under the trade name ULTEM™ or fiber-reinforced epoxy plastic such as the dielectric sold under the trade name G10. In principle any other suitably dielectric may be used.

In an embodiment the electrical field-control system further comprises a field smoothening material e.g. a metal- or semi-conducting material. The field smoothening material preferably constitutes a layer of the electrical field-control system, more preferably an inner layer of the electrical field-control system.

In an embodiment the electrical field-control system provides a transition joint to one of said branch current lead and said branch electrical insulation insulating said branch current lead. The transition joint may preferably be made between surfaces forming matching zig-zag paths or meander paths to increase the creep length or said joint having spherical surfaces to allow for angular adjustment of the branch insulation system, preferably said transitional joint is sealed by a gasket.

In an embodiment at least one of said branch current leads comprising a current lead section, and this current lead section (which may be the whole or a part of the branch current lead) comprising a cold end connected to a neutral conductor or an electrical phase, an opposite ambient temperature end and an intermediate thermal anchor section The intermediate thermal anchor section provides the a thermal gradient from cold to ambient temperature.

In an embodiment at least one of said branch current leads comprising a current lead section comprising thermal anchor section that provides the option of a thermal gradient from cold to lower temperatures.

The termination unit may in an embodiment comprise at least one of a sleeve, an insert and a clamp wherein said sleeve(s), insert(s) and/or clamp(s) has/have each the form of a cuff.

In one embodiment the group consisting of the sleeves, inserts and clamps comprise two, three or more parts for facilitating easy mounting.

For controlling the electrical field the edges and/or surfaces of longitudinal spacers, adaptive inserts, sleeves, clamps, current lead bases may preferably be rounded.

In an embodiment the termination unit comprises at least one insert (adaptive insert) made of material having a specific electrical resistivity above about $10^6 \Omega \cdot m^2/m$ over the operating temperature range.

In an embodiment the termination unit comprises at least one insert (adaptive insert) comprising an epoxy material, such as a fibre reinforced epoxy resin, such as a thermosetting industrial laminate consisting of a continuous filament glass cloth material with an epoxy resin binder.

In an embodiment terminal unit comprising a rigid cylinder or tube located in an opening at the centre of the core former of the end-section of the cable, for providing mechanical support for the end section of the cable.

In an embodiment the termination unit is adapted for providing and electrically terminating a cryogenically cooled multi-phase cable system to termination current leads at ambient temperature. The cable end-section is an end section of a multi-phase cable. The end-section of the multi-phase cable is surrounded by a thermally insulating envelope for enabling the cooling to—and the maintaining of at least a part of the end-section of the cable at a temperature below ambient, wherein the thermally insulating envelope comprises a plurality of branches in the form of branch current lead for branching off from the end-section of the cable electrical phases and the neutral conductor to respective current leads. The branches being arranged sequentially along the longitudinally extending end-section of the cable at locations matching the location of the contacting surfaces of the corresponding end-parts of the neutral conductor and electrical phases in question. The first branch being for branching off the neutral conductor, the second branch for the $N^{th}$ electrical phase, the third branch for the $(N-1)^{th}$ electrical phase, etc., and finally the $(N+1)^{th}$ branch for branching off the $N^{th}$ electrical phase.

The thermally insulating envelope may preferably have an inner cylindrical surface, the end-section of the cable being located along the surface and the points of contact between said surface and said cable defining a substantially straight contacting line, to thereby make a simple and reliable construction.

At least one, preferably all of the branches may in an embodiment be substantially perpendicular to the longitudinal axis of the end-section of the cable.

In an embodiment the thermally insulating envelope enclosing said end-section of said cable is modularly constructed, each module comprising a part for enclosing a length of the end-section of the cable and at least one branch for branching off the neutral conductor or an electrical phase.

For increased cooling the thermally insulating envelope may in an embodiment comprise two separate fluid coolant flow paths.

At least a part of the fluid coolant in the thermally insulating envelope may be restricted to a flow path that is unique for the termination unit and does not pass through the rest of the superconducting cable.

In an embodiment the termination unit comprises a field-control system in contact with an electrically insulating material located around the end-section of the cable at branches of the thermally insulating envelope, the field-control system preferably defining an equi-potential volume at phase voltage and controlling the path of the electric fields in the vicinity of the branch from phase voltage to a ground potential of the termination housing.

Such field-control system may for example comprise a material selected from the group of materials comprising the dielectric sold under the trade nameUltem™, the dielectric sold under the trade G-10™, FRP, Polyethylene, Polypropylene, Nylon and combinations thereof.

In an embodiment, the contacting surface of a given electrical phase or neutral has a length $L_{ucp}$ allowing electrical connection to a current lead for terminating the phase or neutral. In an embodiment, $L_{ucp}$ is adapted to allow a modular build-up of a thermally insulating envelope surrounding a length of the end-section of the cable and comprising at least one branch for housing a current lead. In practice, $L_{ucp}$ is larger than 0.1 m, such as 0.2-0.3 m.

An embodiment of the invention comprises a cooling arrangement where a cooling fluid exchanges heat in the region of the connecting surfaces of the end section. In a particular embodiment, the cooling fluid passes through a connecting block connecting the base of a current lead to a current sleeve. In a further embodiment, the cooling fluid passes close to the contacting surface, in the contacting surface or inside the current sleeve. In yet another embodiment, the cooling fluid passes close to the base of the current lead or through the base of the current lead, in such a way that heat transported through the current lead or generated by electrical currents in the current lead is transferred to the cooling fluid and removed from the contacting surface without significantly increasing the temperature of the superconducting cable. In a preferred embodiment, heat exchanges between the base of the current lead, the contacting surface and the cooling fluid through solid materials with high thermal conductivity, such as copper, silver, gold, aluminium. In one embodiment, flow control tubes guide a portion of or all of the cooling fluid in the cable system towards and through said cooling arrangement.

In one embodiment of the invention, an electrical field-control system comprising one or more field-control elements of a field control system, forms an equi-potential volume. In a particular embodiment, said volume contains the above said cooling arrangement. In a preferred embodiment, the field-control system is applied to or in intimate contact with an outer solid electrical insulation material, such as polymeric or cellulose or ceramic or glass or composite based electrical insulation.

In a further embodiment, said field-control system is provided in the form of a metal-or semi-conducting surface connected to the phase potential of the enclosed contacting surface. In one embodiment, said electrical field-control system considers the axial phase-to-phase electric fields and the radial phase-to-ground electric fields by providing sufficiently long creep lengths and sufficiently thick electrically insulating material. In a preferred embodiment, a fluid surrounds the electrical field-control system and outer electrically insulating material. In one embodiment, the electric field-control system provides a transition joint to a branch current lead and branch electrical insulation.

In a preferred embodiment, the electrical field-control system and the branch insulation system is provided in a single part. In a further preferred embodiment, the electrical field-control system and the branch insulation system is provided in two or more parts with at least one joint, said joint surfaces forming matching zig-zag paths or meander paths to increase the creep length or said joint having spherical surfaces to allow for angular adjustment of the branch insulation system. In one embodiment, said joint is sealed by a gasket made from materials such as PE, Polypropylene, PTFE, Tyvek™, Nomex™, Teflon™ or Gore-Tex™ in order to increase the electrical creep strength.

The covered part of a phase or screen may be covered by electrical insulation and/or semiconducting material. This can include a length-section of the conductive sleeve, for example by winding electrically insulating tapes over a part of the conductive sleeve. In one embodiment, electrically insulating tapes are wound over the region of the sleeve where superconducting tapes are joined to the sleeve.

The number of phase conductors N may in principle be as desired. N, may for example be 1, 2, 3, 4 or more, preferably N is 1 or 3.

The concentric arrangement of a single (N=1) electrical phase and neutral in a cable is also termed a coaxial cable.

The concentric arrangement of a multitude (N) of electrical phases and neutral in a cable is also termed a multi-coaxial cable.

In an embodiment, the contacting surfaces of a multi-coaxial cable is realised in a longitudinal and sequential way characterized in that the neutral-to-phase contact distance and phase-to-phase contact distances are approximately the same.

The term 'ambient temperature' is in the present context taken to mean the temperature at the location where the electrical phases (or neutral) are terminated. Such temperature can e.g. be in the range from −50° C. to +85° C., e.g. between −30° C. and +50° C. or between −10° C. and +30° C.

Further objectives of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 1 shows a cross section of a triax cable.

FIG. 2 shows a sketch of a 3-phase cable termination.

FIG. 3 shows a sketch of a termination built by using a modular approach.

FIG. 4 shows a single-phase coaxial termination built using a modular approach.

FIG. 5 shows an embodiment of an ambient thermal anchor.

FIG. 6 shows different examples of accessories that can be applied on a termination module.

FIG. 7 shows the different elements of an embodiment of a current lead.

FIG. 8a shows several schematic examples of how and where to locate the heat exchanger providing the cooling means of conventional to superconducting transition.

FIG. 8b shows a detailed embodiment of how to connect the current lead with the conductor including location of a heat exchanger providing a thermal anchor.

FIG. 9a shows a sketch of the equi-potential volume at phase potential that is defined by a conductive element inside a dielectric element arranged around a connecting region between the phase conductor and current lead.

FIG. 9b shows a detailed embodiment of the equi-potential volume at phase potential that is defined by a conductive element inside a dielectric element arranged around a connecting region between the phase conductor and current lead.

FIG. 10 shows one embodiment of cooling fluid injection or return.

FIG. 11a shows one cooling configuration with separate cooling of termination and cable at the supply end.

FIG. 11b shows one cooling configuration with separate cooling of termination and cable at the opposite end.

FIG. 12 shows an optional transition between cryostat and termination.

FIG. 13 shows an optional mechanical fixation of the cable with respect to the termination.

FIG. 14 shows an embodiment of a mechanical rigidizer enabling a mechanical robust construction.

FIG. 15 shows in detail one way of terminating the HTS and Cu tapes/wires.

FIG. 16 shows a concept of the adaptive insert that equalises the radial dimension of the different conductor phases and the neutral. The concept works as well for different cable dimensions within reasonably similar ratings.

The figures are schematic and simplified for clarity, and show details that are essential to the understanding of the invention, while other details are left out. Throughout, the same reference numerals are used for identical or corresponding parts in the sense that a feature '102' in FIG. 1 is referred to as '202' in FIG. 2, i.e. the Fig. number precedes the 'through-going' reference numeral.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLES OF THE INVENTION

Embodiments of this invention sets out to enable an easy and standardized connection to the a superconducting cable (ac or dc) including power in and out of the cable, controlled individual cooling of the cable, the cable end section, the current leads and the inside of the termination enclosure. Further, compensation of cable and termination thermal contraction, easy assembly as well as effective cost and effective production of the termination unit(s)/module(s) may be facilitated by the invention.

FIG. 1 is a cross-sectional view of a coaxially arranged multi-phase (here triax) cable 100 comprising N=3 phases and a neutral (screen), eccentrically located in a thermally insulating envelope 102C. The three phases (referred to as phase 1, 2, 3 or 100R, 100S, 100T) and the neutral are placed concentrically around each other, in this case with the innermost located is phase 1, the one located in the middle is phase 2 and the outermost located is phase 3 surrounded by the neutral and finally the thermally insulation envelope, 102C. The cable 100 is impregnated with a cooling fluid, 101, e.g. liquid Nitrogen, in that the space between the inner wall of the thermally insulating envelope and the central opening of the cable (i.e. inner volume of the central former 103 which here supports phase 1) is filled with a cooling fluid 101. Between each phase and between phase 3 and the neutral, a cryogenic dielectric is applied. This invention applies to both AC and DC cables. The cable is e.g. applicable for DC transmission, if the three phases are substituted with minus (phase 1), zero (phase 2), plus (phase 3) and neutral conductor.

In order to terminate this rather complex structure, embodiments of this invention are designed to address and solve a number of issues relating to terminating the electrically conducting as well as the thermally insulating layers. One embodiment of a termination unit is shown in FIG. 2, where all phases (here 3) and the neutral are terminated in one complete construction. The FIG. 2 illustrates a complete vacuum-insulated termination unit (could alternatively or in addition be foam insulated) housing 202 with an optional thermal compensation 221 between the sequentially branched-off phases or neutral. Further, all the main body branches (i.e. the parts of the thermally insulating envelope branching off from the longitudinal direction of the end-section of the cable) are (here) similar and at ground potential and at 90° to the longitudinal direction of the end-section of the cable. Alternatively, the stand-offs could be different (e.g. between neutral and electrical phases), e.g. individually adapted and not necessarily perpendicular to the longitudinal direction of the end-section of the cable. On top of all 4 branches, an intermediate section 211 is attached with the function of controlling the fluid level as well as ensuring a thermal anchor at ambient or elevated temperature for the electrical insulator, 212. Above the thermal anchor section 211, a standard electrical insulator, 212, is applied. This is (here) omitted on the neutral. Above the electrical insulator 212, the current lead is terminated in a top bolt, 214, at ambient temperature and at grid voltage inside optional warm cover 213. Said current lead can comprise a flexible section (cf. e.g. 714 on FIG. 7). Between different parts of the branched-off electrical phases or neutral, sealing flanges 222 are mounted (cf. e.g. between a branch of the termination housing 202 and a thermal anchor section 211, between a thermal anchor section 211 and a warm cover-section 213 and between a warm cover-section 213 and a top bolt 214. The thermally insulating envelope 202D connected to a cryostat 202C is shown to be modularly constructed and to comprise 4 identical T-sections. At both ends, special parts are needed, at the interface to the cable an adapter-piece 225 and at the other end a closing end-piece for terminating the thermally insulating envelope 202D in the longitudinal direction of the end-section of the cable, both pieces optionally housing in- and/or out-lets for cooling fluid and/or monitoring sensors 281. Further, an optionally movable support structure 298 is shown comprising wheels or rollers for allowing the termination unit to move and thereby adapt to thermal expansion or shrinkage of the cable. As it can be seen, due to this T-section structure the branch current leads in the branches being individually insulated from the thermally insulation envelope by individual electrical insulators. The termination housing 202 and the individually insulatings which insulate the branches constitute here the total thermal envelope 202D.

In this embodiment the T-housing has a transition piece, 225, FIG. 2, interfacing the termination unit with the cable thermal envelope. This transition section can be individually evacuated in the field, so the termination unit and the cryostat can be prefabricated and pre-evacuated. The transition piece may be foam insulated as well as vacuum insulated.

Other embodiments of a termination unit are shown in FIG. 3 and FIG. 4 where the modular approach is featured. In this case the idea is to build a complete cable termination unit by connecting a number of (e.g. 2 or 3 or 4 or more) similar modules thus improving production efficiency. Each modular envelope element 302, 402 is supplied with a sealing flange 322, 422 at each end for being coupled to another envelope element. Each modular envelope element has one or more in- and/or out-lets for cooling fluid and/or monitoring sensors 381, 481.

FIG. 3 shows vacuum insulated modular termination housings, 302. In this case, the branches for the electrical phases (two rightmost) are identical but different from that of the neutral (leftmost). Optional thermal contraction compensation elements 321 are shown at various locations on termination housing 302. Each branch is coupled to a fluid-level control section comprising a thermal anchor at ambient temperature 311 via a sealing flange 322, which again (also via a sealing flange 322) is coupled to an electrical insulator section 312. The electrical insulator section 312 is optional and included depending on function (neutral or phase) and depending on voltage rating. Above the electrical insulator, at high potential, is the current termination cover 313, which is coupled to a top bolt 314 via a sealing flange 322.

FIG. 4 shows an embodiment of the modular approach where the branches are minimised, i.e. where the cold to ambient transition is integrated into the voltage transition, insulator 412. Further, it illustrates that the different sections (fluid level and thermal anchor section 411, electrical insulator section 412 and current termination cover-section 413) can be connected in different ways.

FIG. 5 shows the thermal anchor section 511 at ambient temperature and at ground potential implemented by a heater 585. Alternatively, this embodiment is realised by any combination of a controlled heater, a heat radiation source, an infra-red lamp, a fan, cooling ribs or similar.

FIG. 6 demonstrates the application of thermal sensors 684, fluid level gauge 682, pressure gauge 683 as well as vacuum gauge 681 for the vacuum insulation. Similarly a flow detector could be applied close to or in a neutral branch. 601 is the cooling fluid. The end-section of the cable is denoted by reference numeral 600. The current lead 614 is shown to be connected to a current sleeve 616 having electrical contact to the contacting surface of electrical phase (or neutral) via a current clamp 615 mounted around and having electrical contact to the current sleeve 616.

FIG. 7 shows details of a flexible branch current lead. The element is built up by several parts and sections in order to ease the installation of the branch current lead. This, however, does not prevent the branch current lead from being implemented in one complete assembled piece. In this case, however, it would be necessary to build up the termination housing around the current and voltage element in the field instead of, like in this case, insert and connecting the different parts and sections inside the completed termination housing and insulation. In FIG. 7a, the current lead consists of a stiff part 714C, a flexible part 714B for compensating the thermal contraction, a top bolt part 714A that constitute a standard interface with the grid, a hermetic top bolt pass-through 722 enabling a pressure difference between internal and external, a current lead that interfaces with a current clamp 715. Easily accessible connections 714D between the flexible part 714B and the stiff parts 714A and 714C of the current lead are shown and may be implemented by a removable lid in 713, cf. FIG. 7b.

Individually, these parts can be joined optionally with bolts or soldering/brazing/welding or glueing. The seat surface area is maximised to obtain a low resistant connection. In the said embodiment the current clamps 715 contact to the current sleeve 716 that is the actual current termination of a phase conductor. In this case the current sleeve and the phase conductor are connected by soldering. In this embodiment the connecting between the current sleeve and the clamp as well as between the clamp and the lead are provided by bolting the elements together. In another embodiment the same parts can be solder connected, either of the parts can be omitted or any combination of soldering and bolting together can be applied in order to minimize connection resistance and provide ease of assembly. In this example all parts are made of Cu but could be any other material or compound of material with an appropriate electrical resistance (including at cryogenic temperatures).

FIG. 8a shows a module forming a current branch element of a termination unit comprising the end-section of the cable 800, a sleeve 816, a clamp 815, a current lead seat assembly (current leas base) 814, 814E, and alternative means for heat exchange in the form of cooling channels, 818. The electrical phase conductor and the sleeve are solder connected. The sleeves, the clamps and the current leads can be similar for all the phases.

In the ground and/or neutral connection these parts may be similar but will typically be of a more lean design in order to minimize heat leak from the ambient to the cryogenic section. Relating to all the electrically conducting parts each of them can be independently omitted, connected by soldering, brazing, welding, melted, glued, exploded or any other chemi-physical means or connected by bolting, clamping or any other mechanical means. In order to improve electrical and/or mechanical contact the parts can be surface treated to obtain a particular physical appearance and/or coated to inhibit corrosion or chemisorbed contamination.

In FIG. 8b, an example is given on the current sleeve being adapted to the superconducting tapes minimizing the mechanical strain as well as optimizing the electrical contact by having a smooth conical interface between conductor 800 and current sleeve 816 (cf. left part of the sleeve 816). In this example, the connection is made by soldering. The sleeve is positioned and centered around the underlying (phase or former) with a regulating insert 817 that could be made of fibre-reinforced polymer (FRP) or other electrically insulating material operational at low cryogenic temperature. In this embodiment, the regulating insert may also constitute an adaptive insert and serve the purpose of presenting an equal radial dimension to the current sleeve 816 so that the same sleeve unit can be used for all phases as well as for the ground connection (neutral connection). Often, however, the ground may be differently designed. The clamp has longitudinal holes 818 for passing cooling fluid 801 through. In this way the clamps serve as heat exchanger and ultimately as efficient thermal anchor at cryogenic temperatures. Alternatively, the holes and thereby the thermal anchor could be located in the current lead seat 814E, in the sleeve 816 or any combination of locations (cf. FIG. 8a). As it is indicated the interface between current lead seat 814E and top part 815A of current clamp may be zig-zag shaped.

FIG. 9a shows a simple field-control system comprising an electrical field-control element 956, e.g. in the form of a metal or semi-conducting surface. The field-control element is galvanically connected 957 to the phase potential of the cable conductor 900R and thereby defines an equi-potential volume containing cooling fluid 901 and the cooling means 918. Coolant flow guiding tubes, 950, guides a part of the coolant 901 through the equi-potential volume.

In FIG. 9b, the field-control system is provided in the form of an electrical field-control element (956, 951, 952) built up from individual parts in order to ease the installation and in order to separate the functions of each element. Apart from the generic dielectric of the cable, 957, the dielectric of the branch consists of the regulating insert 917 (which can be electrically insulating) between conductor 900 and sleeve 916, a prefabricated horizontal dielectric 950 made from e.g. G10-type fiber-reinforced epoxy plastic, forming a compound dielectric together with the cooling fluid and guiding the coolant flow. In this illustration the element 950 also constitutes a longitudinal spacer/stand-off between two phases or phase to neutral. Thereby substantially equal longitudinal distance between the contacting surfaces can be obtained. A prefabricated vertical dielectric 952, made from e.g. G10, is located between the vertical branch wall of the termination housing, 902, and the current lead, 914. The element 952 has field-control system comprising one or more elements such as metal coating on the inside/high voltage side, 956, extended creep distances in interface, 958, between 952 (G10) and 951 (ULTEM™). There is filler on the inside 954, and on the outside 953 of the vertical dielectric 952 as well as a centring and fixing means 955. Between the vertical dielectric 952, the outer 953 and inner 954 filler is cooling fluid, the fluid also optionally impregnating the dielectric and/or the filler. The horizontal dielectric 951 (ULTEM™) has a double function as facilitating the transition from phase to ground (housing) of one phase (e.g. 900R) at the same time being part of the compound dielectric (dielectric 950, 951 and cooling fluid 901) and field-control element(s) (956) of the transition between one phase (900R) and the succeeding phase (900S) of the conductor 900. Further, the element 951 provides increased creep distance at the horizontal opening, 959. There are field-control element(s) integrated in the adaptive insert, 917E (edge shape) and the current sleeve, 916E (edge shape).

The individual parts of the voltage branch element in FIG. 9b are made either of the same dielectric material or a combination of different dielectric material. The voltage branching arrangement (951+952+956) and the current branching arrangement (916+915+914) are integrated and together provide an equi-potential volume containing the means for heat exchange, 918, between the cooling fluid, the contacting surfaces and the base of the current lead. The parts support each other mechanically.

In FIGS. 10, 11a and 11b two embodiments of cooling fluid in/out are shown. In FIG. 10, the cooling fluid is injected with the option of adjusting the central flow in relation to the annular flow. With the controlling valves 1086 it is possible to direct the cooling fluid to the centre, 101c (FIG. 1) of the conductor and/or to the annulus, 101a (FIG. 1) between conductor and thermal envelope. Further, the cooling fluid is used for cooling the cable as well as cooling the termination part.

In FIG. 11a, one embodiment is implemented where the termination provides a counter flow configuration for the cable. The warm cooling fluid from the cable is extracted through 1187g near the neutral. Close by, cold cooling fluid is injected through 1187f, in a separate annular flow through the termination. The central flow is injected into the termination end, 1186f. In the case that the valve 1186f is closed, the cable and termination would operate with stagnant cooling fluid in the centre. The advantage of this supply and return configuration is that the load dissipated by the termination is not carried through the cable thus providing an increased thermal window for the cable.

In FIG. 11b, said counter flow configuration of the cable is implemented in the opposite end of the cable system. The cooling fluid is injected near the neutral current lead, 1187f, then splitting into the cable annular flow and a separate annular flow through the termination. The central flow of the cable and the annular flow of said termination are extracted from the termination end through valve 1186f and 1186g. In the case where the valve 1186f is closed, the cable and termination would operate with stagnant cooling fluid in the centre. The advantage of this supply and return configuration is that the load dissipated by the termination is not carried through the cable thus providing an increased thermal window for the cable. An optional cooler 1188 is indicated for regenerating the cooling fluid.

FIG. 12 shows an optional adaptor or transition piece, 1225, connecting the termination, 1202, to the cryostat, 1202C. The adaptor, 1225, includes optional thermal contraction compensation, 1221D and vacuum valve and/or gauging 1281. In this embodiment the transition piece 1225 is vacuum insulated, however, it can also be foam insulated or a combination of foam and vacuum insulated.

FIG. 13 illustrates internal clamps, 1318 that mechanically fixes the cable with respect to the termination 1302. In this embodiment the mechanical fixation is located in the cryostat to termination adaptor, 1325, however, it could easily be located also in the neutral section of the termination 1302 or another section at ground potential where the mechanical fixation does not compromise the electrical insulation. Alternatively the fixation could be manufactured in a dielectric material and integrated with the other electrical insulation components.

FIG. 14 illustrates the internal part of one end section of a phase 1400 R, S or T or neutral where the former 1400f is mechanically supported by a rigidizer 1419.

The rigidizer, 1419 can be cylindrically symmetrical and may be hollow for enabling flow of cooling fluid or solid thus preventing any flow through the centre of the cable end section.

FIG. 15A and 15B show a single phase or neutral where the HTS tape/wires 1500 and/or the Cu tapes/wires, 1500 are joined to the sleeve, 1516. In 15B the sleeve, 1516 is showed in detail illustrating the terrace-like connecting area that may be adapted to whether it is a connection with HTS tapes/wires or with Cu tapes/wires. In the present embodiment an example is given with overlap region being 2 cm for Cu and 5 cm for HTS tapes/wires. The step height of the terraces may optionally be adapted to the thickness of the used HTS or Cu tapes/wires. Further, the adapting insert, 1517 is shown to be located around either an underlying electrically insulating neighbour phase, alternatively around the central former.

FIG. 16 illustrate the concept of having a prefabricated regulating e.g. adaptive inserts, 1617 that can be adapted to the radius of different phases or neutral conductors that may be exposed. The adaptive insert may be manufactured in e.g. G10. The adaptive insert 1617 present to the overlaying current sleeve, 1616, a uniform dimension such that one single sleeve shape fits all the phases and neutral as well as can be used in completely different cable terminations, as long as the high voltage part and current ratings are within reasonably similar ranges. Alternatively the current sleeve, 1616, may be manufactured as an adaptive piece, thus presenting to the current clamp, 1615, a uniform dimension. Further, the current sleeve 1616 has a surface mating with the current clamp, 1615 that is longer than the current clamp enabling a limited range of longitudinal freedom for positioning the current clamp and thereby the current lead.

Some preferred embodiments have been shown in the foregoing, but it should be stressed that the invention is not limited to these, but may be embodied in other ways within the subject-matter defined in the following claims. The examples are shown for a 3-phase cable (triax), but might easily be modified to any other number of electrical phases.

The invention claimed is:

1. A termination unit comprising an end-section of a cable, the end section of the cable defining a central longitudinal axis and comprising:
   end-parts of N electrical phases, and
   an end-part of a neutral conductor
   the end-parts of the N electrical phases and the end-part of the neutral conductor each comprising at least one electrical conductor and being arranged in the cable concentrically around a core former with a phase 1 located relatively innermost, and phase N relatively outermost in the cable, phase N being surrounded by the neutral conductor, electrical insulation being arranged between neighbouring electrical phases and between phase N and the neutral conductor, and wherein the end-parts of the neutral conductor and the electrical phases each comprise a contacting surface to provide an electrical connection, the contacting surfaces being located sequentially along the longitudinal extension of the end-section of the cable,
   where the termination unit further comprises:
   a thermally insulating envelope connected to a cryostat,
   special parts at both ends of the termination unit comprising an adapter piece at the interface to the cable and a closing end-piece for terminating the thermally insulating envelope in the longitudinal direction of the end-section of the cable, the special parts at both ends housing at least one of an inlet and outlet for cooling fluid,
   where the space defined by an inner wall of the thermally insulating envelope, as well as a central opening of the cable, i.e. inner volume of the former are filled with the cooling fluid,
   wherein the termination unit is configured to provide a counter flow configuration for the cable, and
   wherein the special part at the interface to the cable houses at least one of an inlet and an outlet configured to provide a cable annular flow of cooling fluid and a separate annular flow through said space defined by the inner wall of the thermally insulating envelope of the termination unit and filled with cooling fluid.

2. A termination unit according to claim 1, where at least a part of said fluid coolant is restricted to a flow path that is unique for the termination unit and does not pass through the rest of the superconducting cable.

3. A termination unit according to claim 1, where the thermally insulating envelope comprises two separate fluid coolant flow paths.

4. A termination unit according to claim 1, where the cooling fluid is injected with the option of adjusting a central flow in relation to the annular flow.

5. A termination unit according to claim 1, where the cable and termination operate with stagnant cooling fluid in the center.

6. A termination unit according to claim 1, where each of said contacting surfaces have a longitudinally extension and is electrically connected to at least one branch current lead to provide said electrical connection.

7. A termination unit according to claim 6, wherein said at least one branch current lead is individually insulated from said thermally insulation envelope by individual electrical insulators.

8. A termination unit according to claim 7, wherein at least one of said electrical connections comprises an electrical field-control system at least partially surrounding the contacting surface and at least a part of said at least one branch current lead.

9. A termination unit according to claim 6, comprising at least one longitudinal spacer that provides a fixed distance between the branch current leads, said spacers providing substantial equi-distance between the branch current leads.

10. A termination unit according to claim 9, where the longitudinal spacer function as flow control or flow restraint for the cooling fluid guiding at least a part of the cooling fluid through at least one of the heat exchanging means near the contacting surface and the base of the base current lead.

11. A termination unit according to claim 6, where at least one of said branch current leads comprising a current lead section comprising a cold end connected to one of a neutral conductor an electrical phase, and an opposite ambient temperature end and an intermediate thermal anchor section, said intermediate thermal anchor section provides a thermal gradient from cold to ambient temperature.

12. A termination unit according to claim 1, where said end-section comprises at least one current lead base, said termination unit being arranged such that a cooling fluid will exchange heat with said at least one current lead base.

13. A termination unit according to claim 1, where at least one of said electrical connections comprises an electrical field control system at least partially surrounding the contacting surface and providing an equi-potential volume at the respective phase voltage.

14. A termination unit according to claim 13, where a cooling fluid is adapted to be directed inside said equi-potential volume.

15. A termination unit according to claim 1, where the contacting surfaces being located sequentially along the longitudinal extension of the end-section of the cable and are arranged according to a modular concept by ensuring that the contacting surface of each of the neutral conductor and electrical phases at least over a part of the lengths of their contacting surfaces are located at a substantially equal radial distance from the central longitudinal axis.

16. A termination unit according to claim 1, wherein the contacting surfaces of the end-section of the cable being located with substantially equal longitudinal distance between them.

17. A termination unit according to claim 1, where at least one of the neutral conductor or electrical phases has electrical contact to a current sleeve.

18. A termination unit according to claim 17, where the current sleeve is at least partly of a superconductive material.

19. A termination unit according to claim 17, where at least a part of the current sleeve provides the electrical connection between said contacting surfaces and respective branch current leads.

20. A termination unit according to claim 17, where said current sleeve has a sleeve contacting surface for being electrically connected to a current lead, and where a substantially equal radial distance from the central longitudinal axis of the sleeve contacting surface of the neutral conductor and electrical phases is provided by individual adaptation of radial dimensions of said current sleeves.

21. A termination unit according to claim 20, where superconducting material from the cable itself constitutes at least in part said sleeve contacting surface.

22. A termination unit according to claim 1, where at least one of said electrically connections comprises through going holes.

23. A termination unit according to claim 1, where at least one of the electrical phases and neutral conductor comprises superconductive material.

24. A termination unit according to claim 1, where the number of phase conductors N is 1.

25. A termination unit according to claim 1, where the number of phase conductors N is 3.

26. A termination unit according to claim 1, where the electrical connection comprises at least one of a sleeve, an insert and a clamp wherein said sleeve, insert and clamp each has the form of a cuff.

27. A termination unit according to claim 1, where said terminal unit comprise a rigid cylinder located in an opening at the center of the core former of the end-section of the cable, for providing mechanical support for the end section of the cable.

28. A termination unit according to claim 1, where said thermally insulating envelope enclosing said end-section of said cable is modularly constructed, each module comprising a part for enclosing a length of the end-section of the cable and at least one branch for branching off one of the neutral conductor and an electrical phase.

29. A termination unit according to claim 1, comprising a field-control system in contact with an electrically insulating material located around the end-section of the cable at branches of the thermally insulating envelope, the field-control system defining an equi-potential volume at phase voltage and controlling the path of the electric fields in the vicinity of the branch from phase voltage to a ground potential of the termination housing.

30. A termination unit according to claim 1, wherein the special part at the interface to the cable houses one of an inlet and an outlet configured to allow the cooling flow to be split into a cable annular flow of cooling fluid and a separate annular flow through the fluid filled space defined by the inner wall of the thermally insulating envelope of the termination unit.

* * * * *